(12) United States Patent
Fu

(10) Patent No.: US 7,516,266 B2
(45) Date of Patent: Apr. 7, 2009

(54) SYSTEM AND METHOD CAPABLE OF SEQUENTIALLY WRITING DATA TO A FLASH MEMORY

(75) Inventor: Hung-Shiun Fu, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 174 days.

(21) Appl. No.: 10/908,112

(22) Filed: Apr. 28, 2005

(65) Prior Publication Data

US 2005/0246480 A1 Nov. 3, 2005

(30) Foreign Application Priority Data

Apr. 29, 2004 (TW) .............. 093112065 A

(51) Int. Cl.
*G06F 12/00* (2006.01)
(52) U.S. Cl. .............. 711/103; 711/203; 711/206
(58) Field of Classification Search .................. 711/103
See application file for complete search history.

(56) References Cited

U.S. PATENT DOCUMENTS

| 5,404,485 A | 4/1995 | Ban | |
| 5,937,425 A * | 8/1999 | Ban | .......................... 711/103 |
| 6,219,770 B1 * | 4/2001 | Landau | ....................... 711/162 |
| 6,678,785 B2 * | 1/2004 | Lasser | ......................... 711/103 |
| 7,035,993 B2 * | 4/2006 | Tai et al. | ...................... 711/206 |
| 7,310,721 B2 * | 12/2007 | Cohen | ......................... 711/206 |
| 2003/0070035 A1 * | 4/2003 | Wang | ......................... 711/103 |
| 2003/0101327 A1 | 5/2003 | Beck | |
| 2004/0085849 A1 * | 5/2004 | Myoung et al. | ............. 365/232 |

FOREIGN PATENT DOCUMENTS

| DE | 198 45 295 A1 | 9/1999 |
| EP | 1 244 019 A2 | 9/2002 |

\* cited by examiner

*Primary Examiner*—Reginald G Bragdon
*Assistant Examiner*—Eric Loonan
(74) *Attorney, Agent, or Firm*—Winston Hsu

(57) ABSTRACT

A system capable of sequentially writing data to a flash memory. The system includes at least one virtual block, at least one physical block, and at least one active block. Each virtual block has a plurality of virtual pages and a virtual block address. Each virtual page has a virtual page offset. Each physical block has a plurality of physical pages and a physical block address. Each physical page of the physical block has a physical page offset. Each active block has a plurality of physical pages and an active block address. Each physical page of the active block has a physical page offset. Each virtual block is mapped to one physical block. In the mapped virtual and physical blocks, each virtual page is mapped to one physical page. In the mapped virtual and physical pages, the virtual page offset is the same as the physical page offset.

25 Claims, 14 Drawing Sheets

SYSTEM AND METHOD CAPABLE OF SEQUENTIALLY WRITING DATA TO A FLASH MEMORY

BACKGROUND

The present invention relates to flash memory systems, and more particularly, to a system and method capable of sequentially writing data to a flash memory while having a high update efficiency and reading efficiency.

Compared with traditional magnetic storage devices, flash memory is cheaper and has less power consumption. However, in the flash memory, direct rewriting of a block having data stored therein is not permitted. In other words, to rewrite a block that has data already, the currently stored data must first be erased before the block can be rewritten by new data. Moreover, flash memory has a limitation of the number of erasing and writing operations thereon. If a particular block has been erased and written over certain number of times such as 100K times, the particular block will be damaged, and will be unable to correctly store data. Additionally, flash memory may have some bad blocks formed during the manufacturing process in the factory, or caused by excessive usage by the user. In general, flash memory's access is managed through an FFS (Flash File System, FFS). The FFS is capable of dispersing the erasing and writing operations on different blocks in order to reduce the probability of some particular blocks being overused, and to avoid using the bad blocks.

According to a Mapping Table, this flash file system (FFS) translates the logic address into the flash memory's physical address, and then writes data into the block to which the physical address points. The upper of the file system, such as FAT, access the file system randomly, not sequentially, resulting in data being randomly written into the flash memory. However, for the sake of promoting the data reliability of the flash memory, flash memory factories, such as Toshiba, have announced that the new generation of NAND flash memory only allows data to be written sequentially into physical blocks. Therefore, former flash file system (FFS) cannot satisfy this requirement.

FIG. 1 shows mapping virtual blocks 12 onto physical blocks 14 by using the Mapping Table 10. As shown in FIG. 1, a flash memory has a plurality of physical blocks 14 (block 0 to block n), and each of the physical blocks 14 contains a plurality of physical pages 16. The basic erase unit in a flash memory is one physical block. In other words, if the erasing operation is performed, all of data stored in the physical block will be erased. Additionally, the basic write unit for a flash memory is one physical page. In other words, data is written into the flash memory by writing page by page.

The related art FFS uses Block-Mapping to map the virtual blocks onto the physical blocks. In other words, the basic mapping unit is one block. As shown in FIG. 1, the number of virtual blocks 12 is equal to the number of physical blocks 14. However, it should be noted that in some embodiments, the number of virtual blocks is not equal to the number of physical blocks. Each of the virtual blocks 12 has its virtual block address, and each of the physical blocks 14 has its physical block address. FIG. 2 is a detailed diagram of the Mapping Table 10. The Mapping Table 10 has a plurality of mapping data 18. Each of the mapping data 18 stores one virtual block address and one physical block address, to establish a mapping relation between a virtual block 12 and a physical block 14. According to FIG. 2, the virtual block with the virtual block address equaling to 1 is mapped onto the physical block with the physical block address equaling to 81. Because of some bad blocks in flash memory, the number of usable physical blocks might be smaller than the number of virtual blocks. Additionally, care must be taken to avoid frequently writing and erasing one particular block, which would result in the reduced life of the particular block. So the Mapping Table 10 needs to change its stored mapping relations between virtual blocks and physical blocks according to different situations, to achieve the goal of not using the bad blocks and not overusing some particular blocks.

As shown in FIG. 1, each physical block 14 has a plurality of physical pages 16. In the same way, each virtual block 12 has a plurality of virtual pages 20. The number of physical pages 16 in one physical blocks 14 is equal to the number of virtual pages 20 in one virtual block 12. Furthermore, each physical page 16 has its physical page offset value, and each virtual page 20 has its virtual page offset value. When one of the virtual blocks 12 is mapped onto one of the physical blocks 14, each of the virtual pages 20 in the virtual blocks 12 is mapped one by one onto each of the physical pages 16 in the physical blocks 14, where one virtual page 20 having a specific virtual page offset value is mapped onto one physical page 16 whose physical page offset value is equal to the specific virtual page offset value.

FIG. 3 shows operation of the related art block mapping. For example, assume that each physical block 14 includes thirty-two physical pages 16, and each virtual block 12 includes thirty-two virtual pages 20. To find out the physical page mapped to the virtual page whose virtual page number is equaling to 161, the following steps have to be performed. First, divide the virtual page number, 161, by the number of pages per block, which is 32, to get a quotient A which is equal to five and a remainder B which is equal to one. The quotient A represents a virtual block address, and the remainder B represents a virtual page offset value. In this case, we have the equation: 161=5*32+1. So the virtual address of a virtual block containing the searched page is first determined. In this case, the virtual block address is five. The Mapping Table 10 is then used to locate a physical block whose physical block address is mapped onto the virtual block having virtual block address equaling five. Therefore, the physical block with the physical block address equaling to three is found. Then, use the virtual page offset value, which is one in this case, to search the physical block for the physical page, which has a physical page offset value equaling to one also.

Because the Mapping Table only contains the relations between the virtual blocks and the physical blocks, it doesn't need a large memory space. However, the new generation of flash memory demands for writing data sequentially, and in this situation, using the above mentioned mapping method causes a low update efficiency problem.

Writing data sequentially means that in a specific physical block, physical pages having smaller physical page offset values must be written prior to those having greater physical page offset values. In other words, before writing data into the physical page having offset value equaling to n, it must first be checked if data have been written in any of the physical pages having offset values greater than n. If there is data stored in any of the physical pages having offset values greater than n, this means that the physical block has already been written with data in the physical page(s) having offset value(s) greater than n. If data is still written into the physical page having offset value equal to n, this will violate the rule for new generation flash memories to write data sequentially. This is because writing data sequentially requires writing data into a later physical page whose physical page offset value must be greater than that of any other previously written physical page.

In this scenario, before writing data into the physical page having physical page offset value equal to n, if it is found that there is already another physical page, whose physical page offset value is greater than n, having been written with data, a new physical block has to be located. After locating the new physical block, the file system has to sequentially copy data from original physical pages with physical page offset values smaller than n in that physical block and write the data into new physical pages with physical page offset values smaller than n in the new physical block, and then write data into the new physical page having physical page offset value equal to n in the new physical block, and finally sequentially copy data from original physical pages with physical page offset values greater than n in that physical block and write the data into new physical pages with physical page offset values greater than n in the new physical block. Therefore, the requirement of writing data sequentially is met. In the mentioned scenario, in order to update one physical page's data in one physical block, the system has to move a large amount of data and perform data erasing, causing the low update efficiency problem and an increased probability of damaging blocks in the flash memory.

FIG. 4 shows how to update a physical page. Assume that the system wants to write data into the physical page of physical page offset value being 3 (page 3 or the fourth page). Even though the fourth page is empty (never been written before), writing data into the fourth page is prohibited because the physical pages having higher physical page offset values have already been written. Therefore, writing data into the fourth page will not satisfy the rule of writing data sequentially. The FFS must ask for a new physical block, and then copy all data stored in the pages before the fourth page to the new physical block (the first step), then write data into the fourth page of the new block (the second step), then copy all data stored in the pages after the fourth page (the third step), then erase all pages in the original physical block (the fourth step), and finally update the Mapping Table to map the virtual block to the new physical block (the fifth step). After finishing the above five steps, the whole update process is finished. Therefore, in order to update one physical page, all data stored in the pages of one physical block must be copied to the pages in another new physical block. In other words, every time the data update is performed, the system has to execute the action of copying and erasing, which lowers the update efficiency, and might increase the number of bad blocks in the flash memory.

In order to solve the above problems, as indicated by M-System INC., et al. in U.S. Pat. No. 6,678,785, a method of sequentially writing data into a flash memory is introduced to improve the update efficiency. FIG. 5 shows another related art method of sequentially writing data into a flash memory. When the system wants to update the physical page of physical page offset value being three (the fourth page) in one physical block, no matter the fourth page is empty or not and the physical pages after the fourth page are empty or not, the system will search from the first page to judge whether there is any empty physical page in the physical block. If there is any empty physical page in the physical block, the system writes data into the first found empty physical page. If there isn't, the FFS will ask for a new physical block and write data into the first physical page in the new physical block. In other words, unless the fourth page happens to be the first found empty physical page, no matter whether writing to the original physical block's empty page or the first page of the newly found physical block, the physical page offset value of the physical page storing the data doesn't have the same value as the virtual page offset value of the mapped virtual page. That is, the physical page and the virtual page don't have the fixed offset relation anymore. Therefore one virtual block will be mapped onto at least one physical block, resulting in a one-to-many mapping relation between physical pages and virtual pages. This mapping relation will remain until there is no empty physical block in the system, or will be compacted into one-to-one mapping relation when one virtual block is mapped to too many physical blocks.

Because the above related art method involves writing data directly into the empty physical page, it doesn't need to copy and erase data, so not only data are sequentially written, but also the update efficiency is enhanced. In addition, the times of erasing data in the blocks of the flash memory are reduced accordingly. However, when the system wants to find one physical page, it uses the Mapping Table to find out the mapped physical block, and then has to search all the physical pages in the physical block one by one until it finds the wanted physical page. This is because the virtual page and the physical page don't have the same offset value. The reading efficiency will be greatly worsened. To avoid searching one page by one page, an additional record field of the Mapping Table needs to be created. In other words, the relation between the physical page and virtual page must be built in the Mapping Table. Since the number of physical pages (or virtual pages) is much greater than the number of physical blocks (or virtual blocks), a large space is required by the Mapping Table. Additionally, the recorded mapping relationship between physical pages and virtual pages increases the complexity of searching. In other words, using the related art method disclosed by M-System INC. impairs the reading efficiency, requiring a large amount of memory space and increases the searching complexity.

SUMMARY

One objective of the claimed invention is therefore to provided a system and method capable of sequentially writing data into a flash memory for promoting update efficiency, to solve the above-mentioned problems.

According to an exemplary embodiment of the present invention, a system capable of sequentially writing data to a flash memory is disclosed. The system comprises at least one virtual block in which every virtual block comprises a plurality of virtual pages and has a virtual block address, and each virtual page has a virtual page offset value; at least one physical block in which every physical block comprises a plurality of physical pages and has a physical block address, and each physical page has a physical page offset value; and at least one active block in which every active block comprises a plurality of physical pages and has a active block address, and each physical page has a physical page offset value. Every virtual block is mapped onto a physical block, and every active block is mapped onto a physical block. In the corresponding virtual and physical blocks, every virtual page is mapped onto every physical page, and in the corresponding virtual and physical pages, the virtual page's offset value is equal to the physical page's offset value.

It is one of the advantages of the present invention that the physical page and its corresponding virtual page still have the same offset value. Therefore, the system not only has greater update efficiency, but also avoids too much memory space to be used, while the complexity of searching is not increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
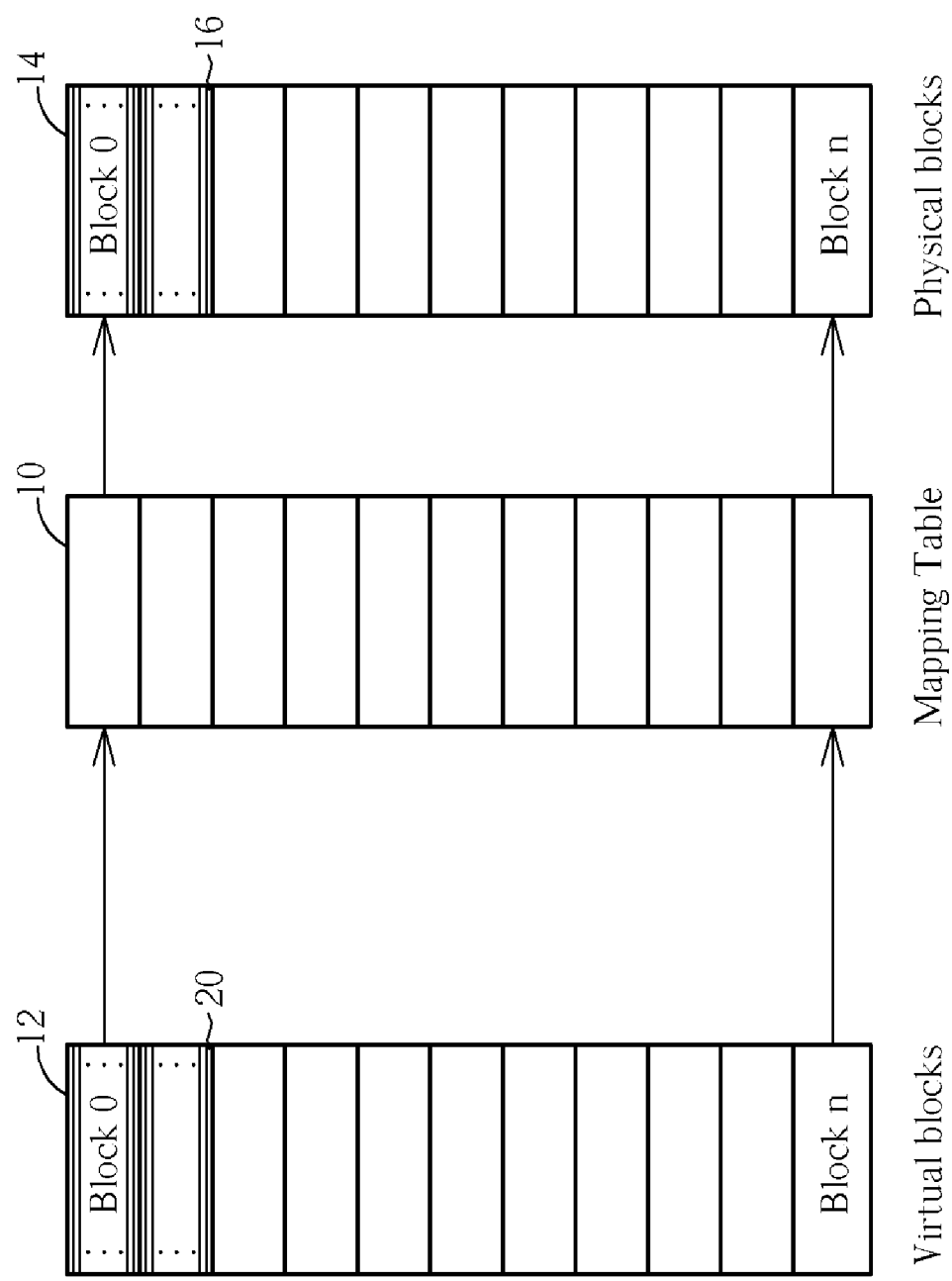
FIG. 1 is a diagram illustrating a Mapping Table mapping a plurality of virtual blocks onto a plurality of physical blocks.
Figure 2:
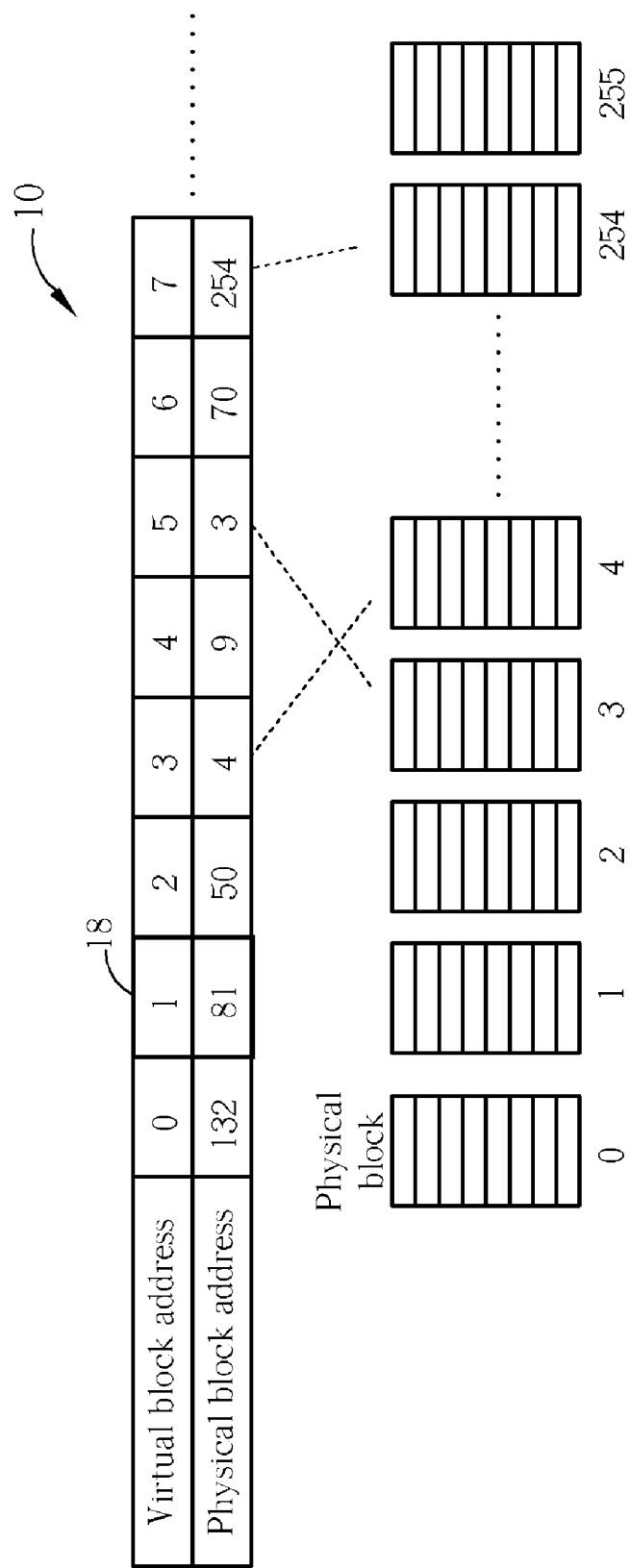
FIG. 2 is a diagram of the Mapping Table.
Figure 3:
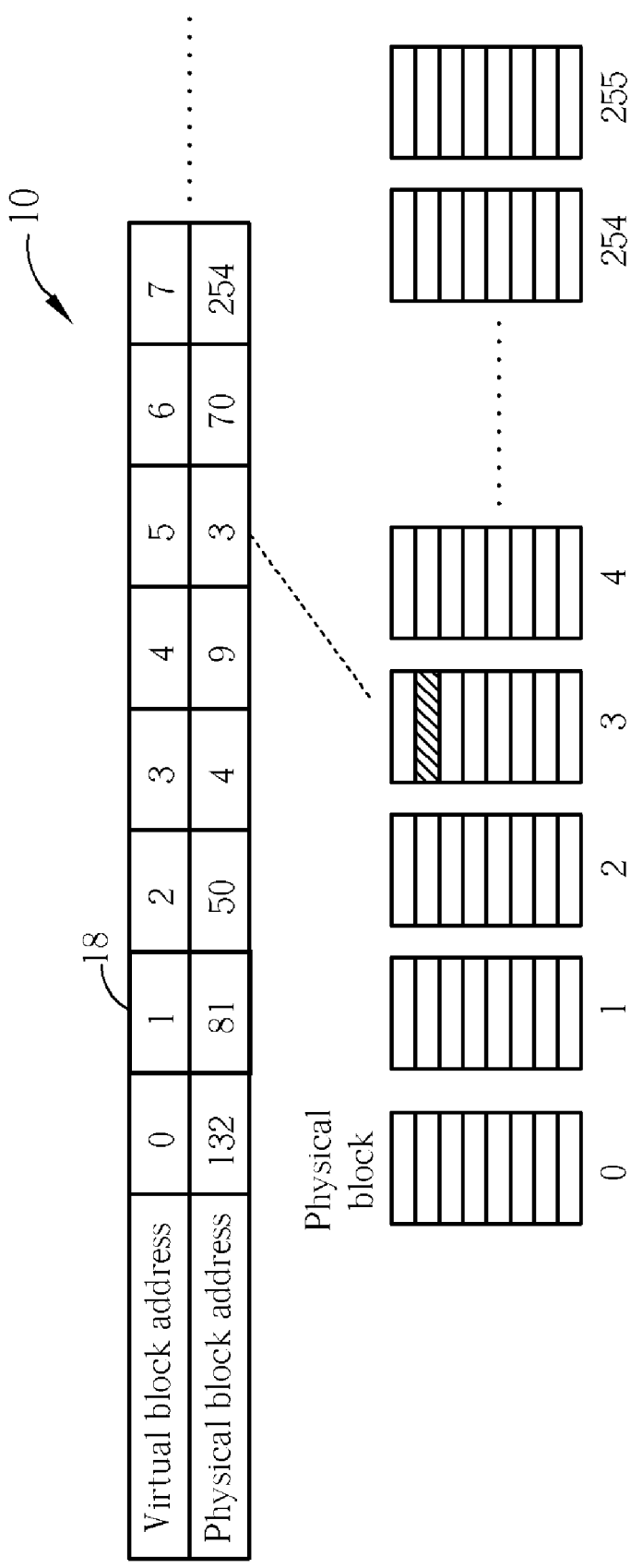
FIG. 3 is a diagram illustrating operation of the block mapping.
Figure 4:
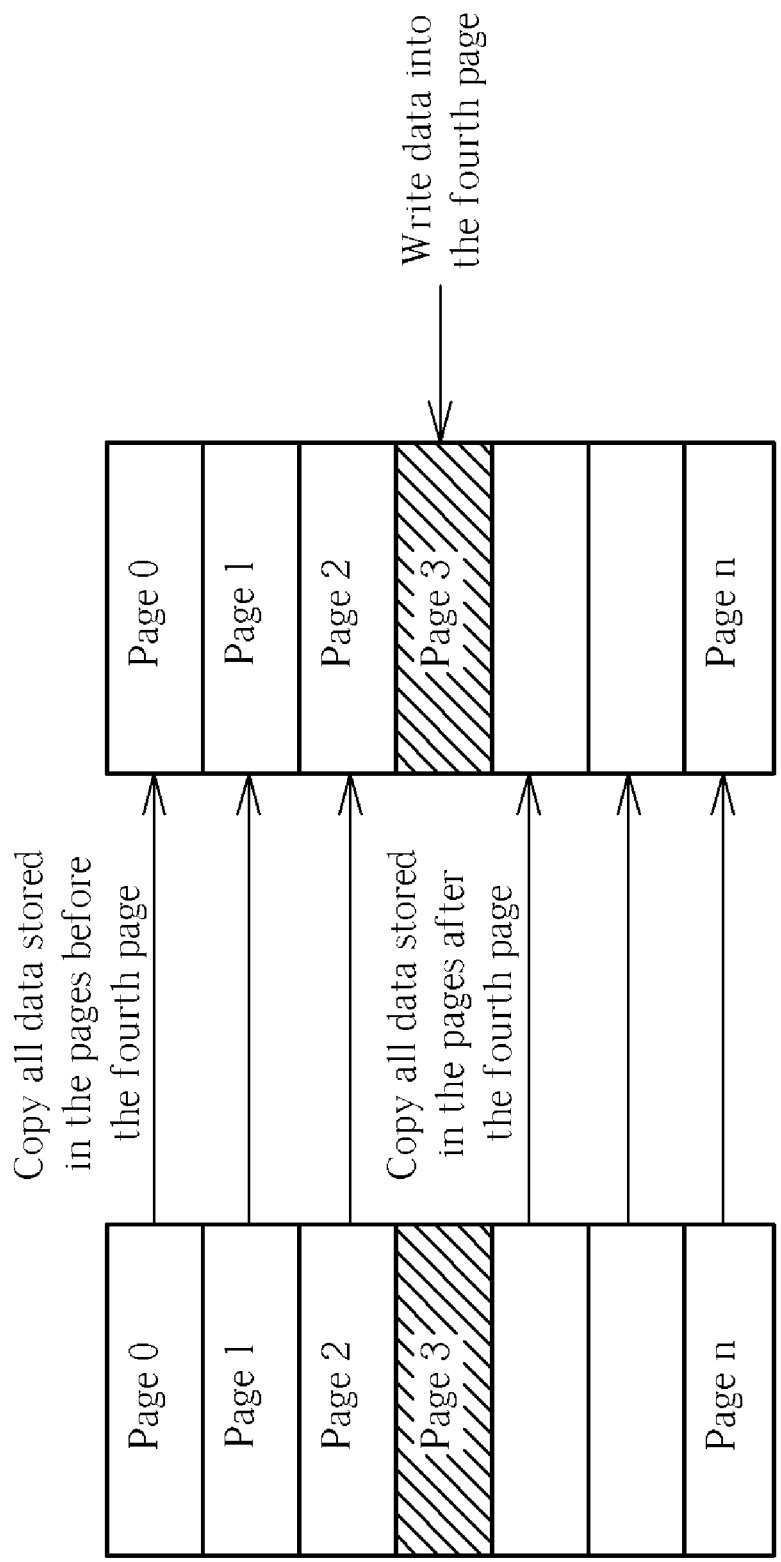
FIG. 4 is a diagram illustrating how to update a physical page according to the related art.
Figure 5:
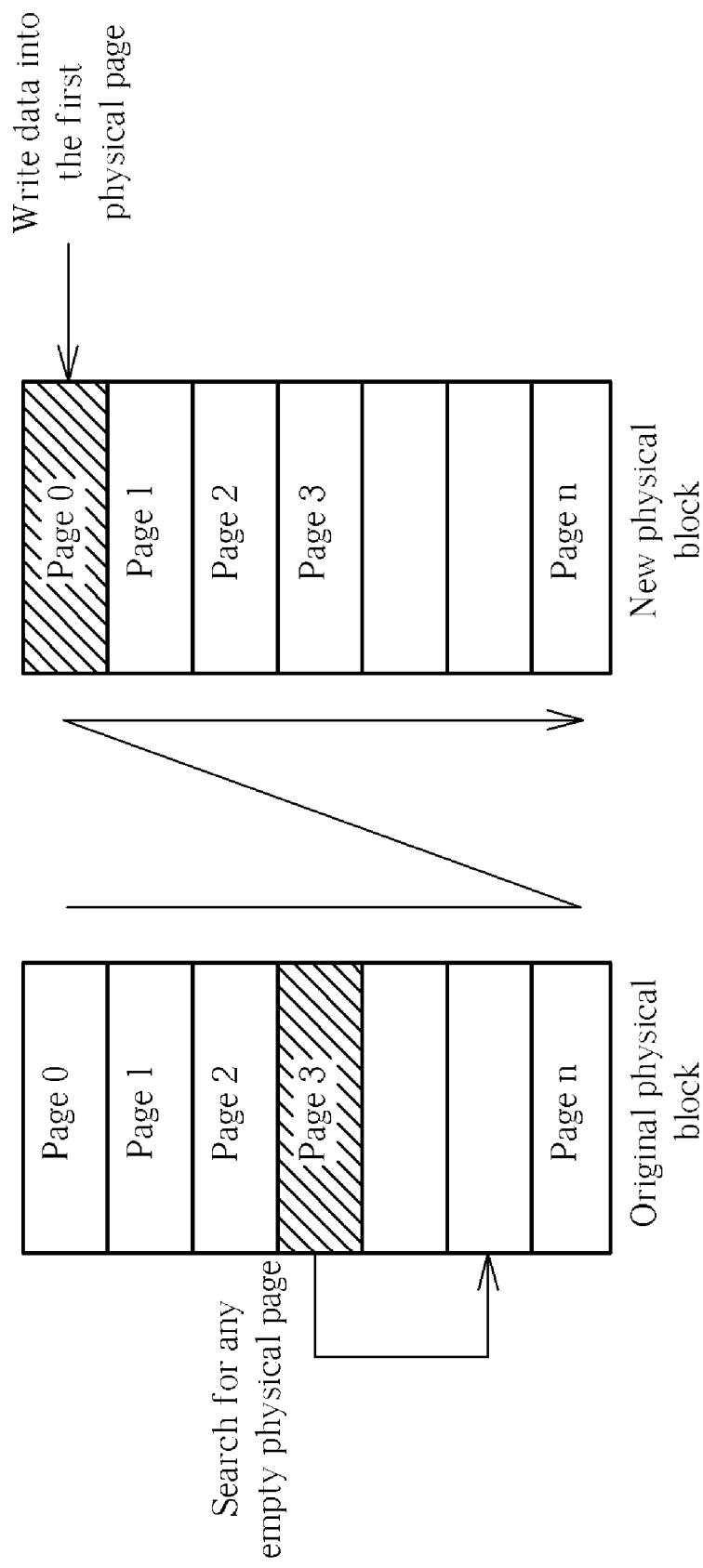
FIG. 5 is a diagram illustrating another method of sequentially writing data according to the related art.
Figure 6:
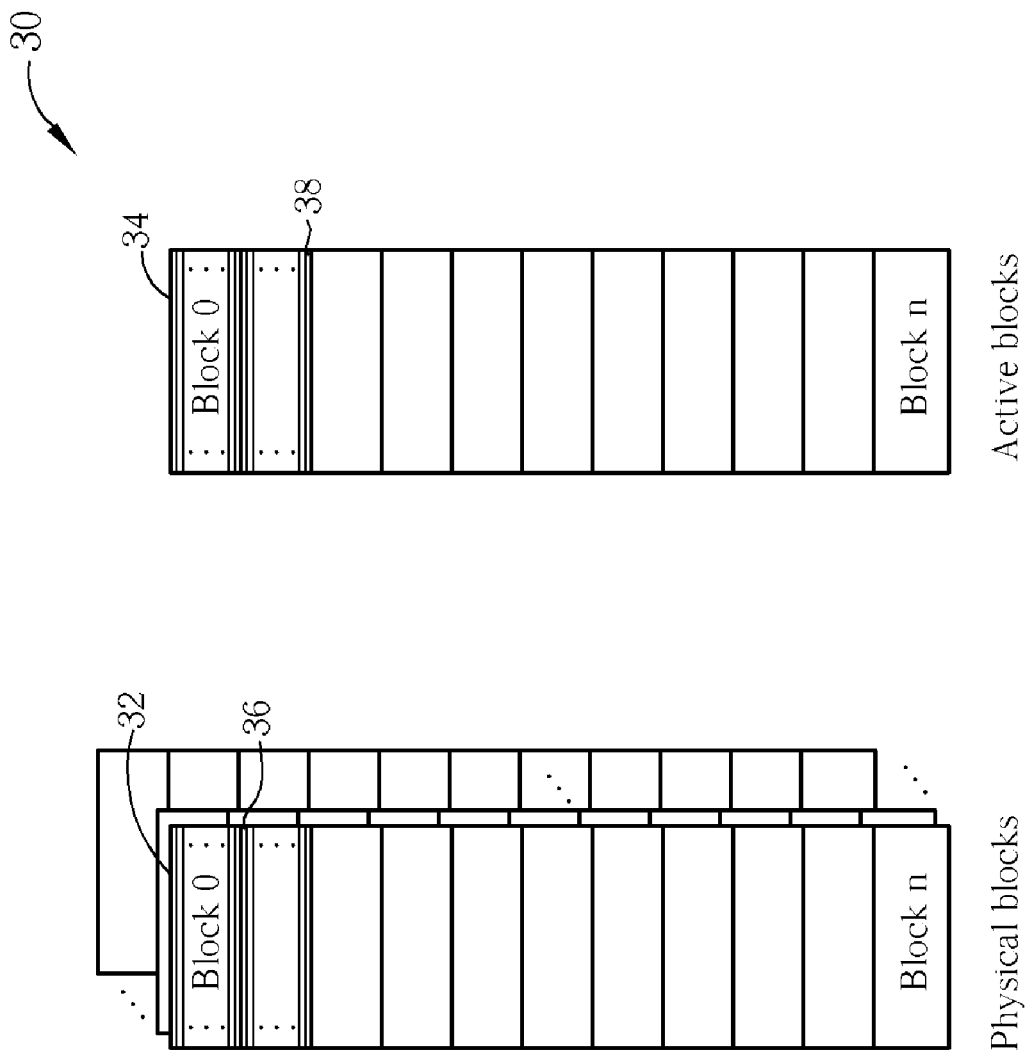
FIG. 6 is a diagram illustrating a flash memory according to an exemplary embodiment of the present invention.

FIG. 6 shows a flash memory 30 according to an exemplary embodiment of the present invention. The flash memory 30 has a plurality of physical blocks 32 and a specific number of active blocks 34. Each active block 34 corresponds to one single physical block 32. In this embodiment, each virtual block (not shown in FIG. 6) is only mapped to one physical block. Additionally, in this embodiment, the flash memory 30 only has one active block 34, so the active block 34 is mapped to one of the physical blocks 32.

In each of the physical blocks 32, every physical page 36 and its mapped virtual page (not shown in FIG. 6) must have the same offset value. In other words, each physical page in any physical block has the same offset relation with the virtual page in the mapped virtual block. However, the physical page 38 in the active block 34 does not need to have the same offset value with the mapped virtual page. Please note that both physical block 32 and active block 34 follow the rule of sequentially writing. In other words, the offset value of the currently written physical page must be larger than the offset values of all previously written physical pages. In this embodiment, writing data into any physical page 36 in one of the physical block 32 has to follow two rules: firstly, the offset value of physical page used for recording data must be equal to the offset value of the mapped virtual page; secondly, the offset value of the currently written physical page needs to be larger than the offset values of all previously written physical pages. Writing data into the active block 34 has to follow just one rule (the sequential data writing rule): the offset value of the currently written physical page used for recording data must be larger than offset values of all previously written physical pages.

Figure 7:
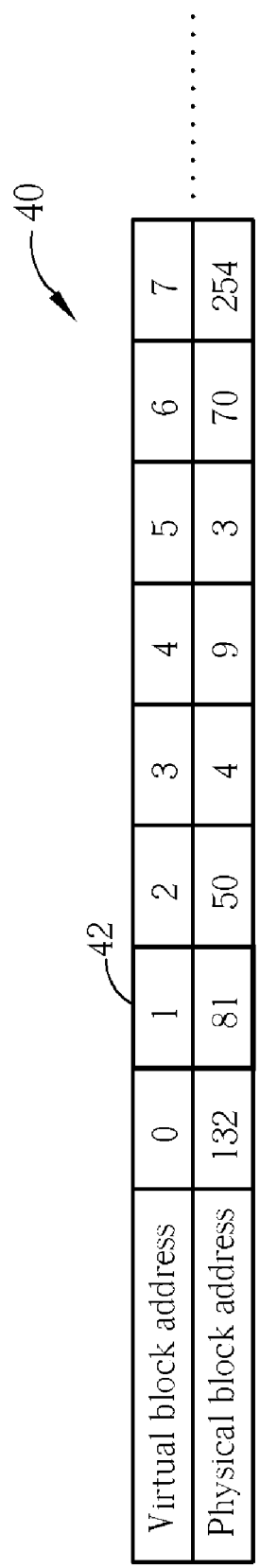
FIG. 7 is a diagram illustrating a first Mapping Table according to an exemplary embodiment of the present invention.

FIG. 7 shows a first Mapping Table 40 according to an exemplary embodiment of the present invention. The first Mapping Table 40 is used to record the mapping relation between the physical blocks 32 and the virtual blocks. As shown in FIG. 7, the first Mapping Table 40 has a plurality of mapping data 42. Each of the mapping data 42 stores one virtual block address and one physical block address to illustrate the mapping relationship between the virtual block and the physical block. Additionally, one virtual block is at most mapped to one physical block.

Figure 8:
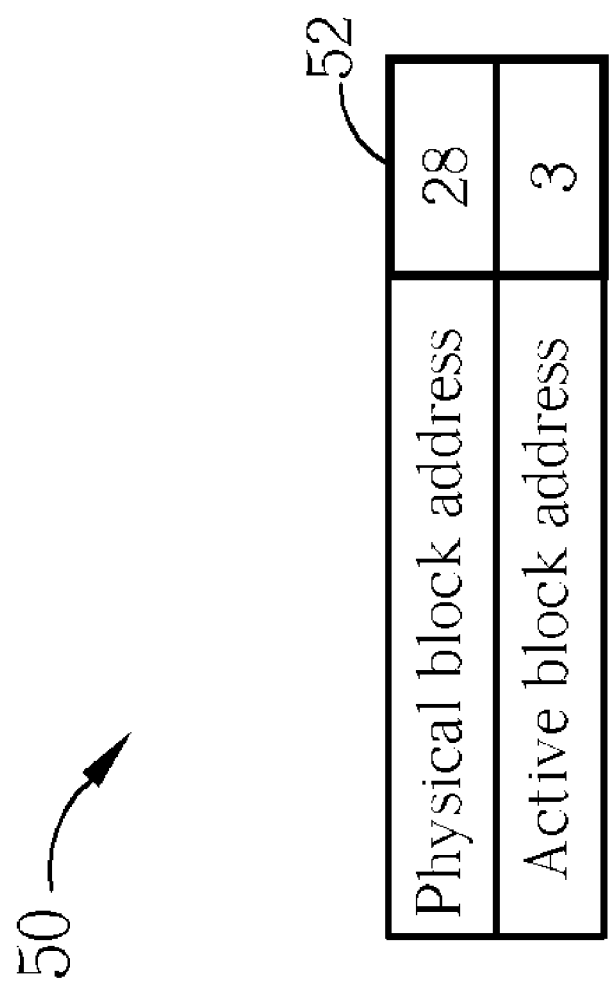
FIG. 8 is a diagram illustrating a second Mapping Table according to an exemplary embodiment of the present invention.

FIG. 8 shows a second Mapping Table 50 according to an exemplary embodiment of the present invention. The second Mapping Table 50 is used to record the mapping relation between the physical blocks 32 and the active blocks 34. The second Mapping Table 50 is allowed to include a plurality of mapping data 52. Each of the mapping data 52 stores one physical block address and one active block address. In this embodiment, the flash memory 30 only has one active block, so the second Mapping Table 50 shown in FIG. 8 only has one mapping data 52 to illustrate which physical block the active block is mapped onto.

Figure 9:
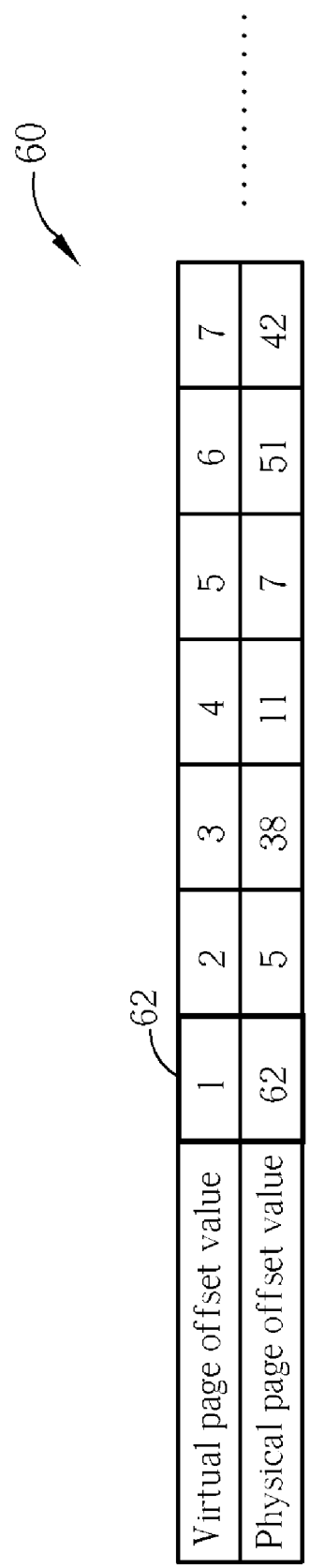
FIG. 9 is a diagram illustrating a third Mapping Table according to an exemplary embodiment of the present invention.

FIG. 9 shows a third Mapping Table 60 according to an exemplary embodiment of the present invention. The third Mapping Table 60 is used to record the mapping relation between the virtual pages and the physical pages of the active block 34. The third Mapping Table 60 has a plurality of mapping data 62. Each of the mapping data 62 has one virtual page's offset value and one physical page's offset value in the active block 34 to illustrate the relation between the virtual page and the physical page of the active block 34. As mentioned before, each physical page 38 in the active block 34 and its corresponding virtual page do not have the same offset value. Therefore, the third Mapping Table 60 is needed to record the mapping relation between the virtual pages and the physical pages of the active block 34. Because the third Mapping Table 60 only records the relation between virtual and physical pages in the active block 34, the memory space of the third Mapping Table 60 is determined by the number of the active blocks 34 and the number of physical pages in each of the active blocks 34. The larger is the number of active blocks, the larger memory space is needed. In this embodiment, only one active block 34 is used, so the third Mapping Table 60 does not occupy a large memory space.

Figure 10:
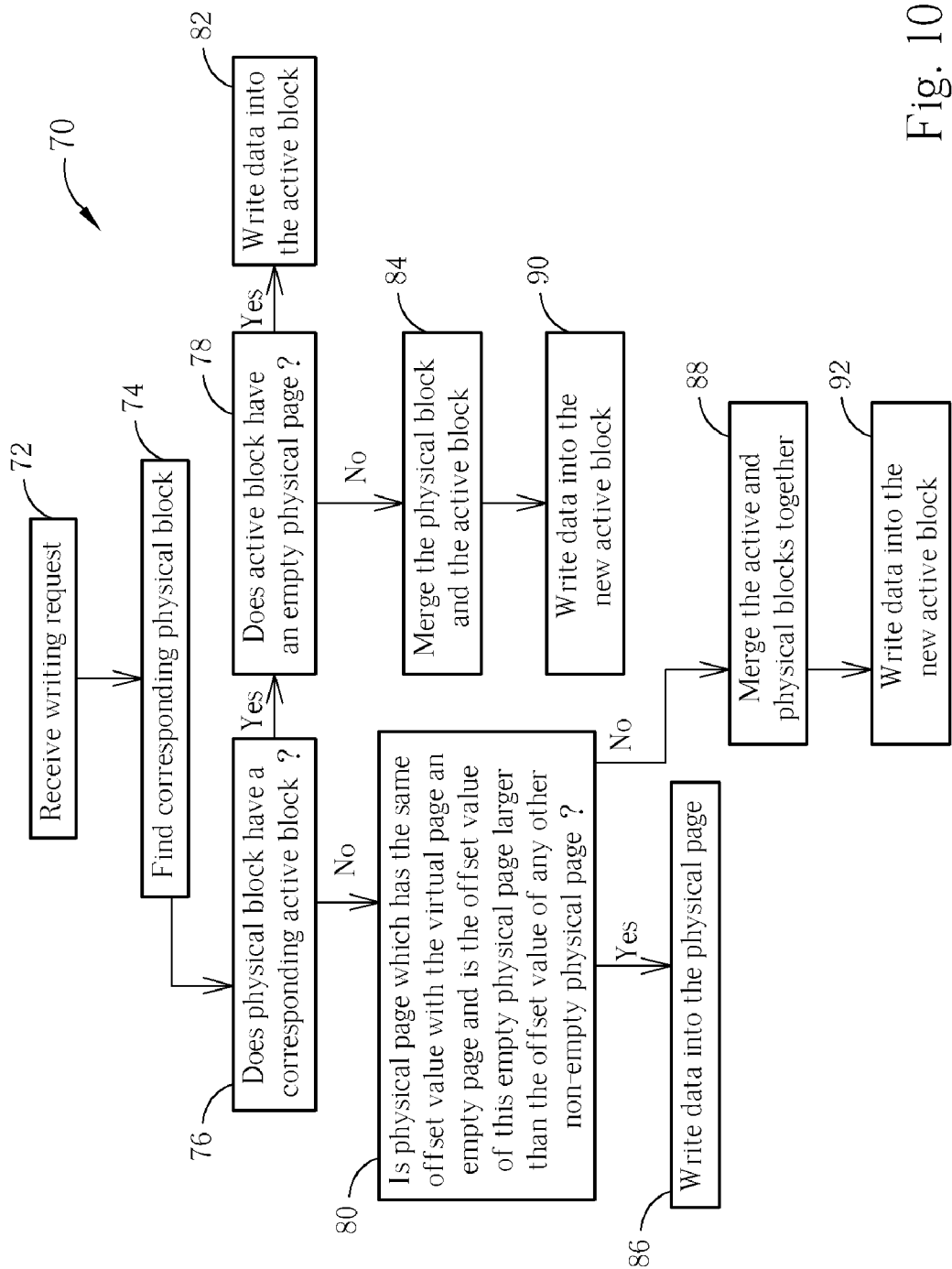
FIG. 10 is a flowchart of sequentially writing data into a flash memory according to an exemplary embodiment of the present invention.

FIG. 10 shows a flowchart of a method 70 for sequentially writing data into the flash memory 30 according to an exemplary embodiment of the present invention. First the FFS receives the writing request from the upper of system, such as the FAT (Step 72). This writing request has a virtual page number. According to the virtual page number, the FFS is capable of finding the corresponding physical block (Step 74). As mentioned above, the FFS divides the virtual page number by the number of pages per block to get a virtual block address, and then uses the first Mapping Table 40 to identify the corresponding physical block.

Then the FFS uses the second Mapping Table 50 to judge whether the physical block corresponds to an active block. If it does, Step 78 is executed; otherwise, Step 80 is executed. In the Step 78, the FFS searches one page by one page from the first physical page to judge whether the corresponding active block has an empty physical page. If it has, Step 82 is executed; otherwise, Step 84 is executed. In the Step 82, the FFS writes data into the first found empty physical page of the corresponding active block. Because the FFS searches one page by one page from the first physical page, the first found empty physical page's offset value is surely larger than any existing non-empty physical page's offset value, so this complies with the sequential writing rule.

Further, the present invention can implement a pointer to point to a physical page following the newly written physical page. That is, the pointer is used to point to a first found empty physical page. Then, the FFS does not need to search one page by one page from the physical pages in the active block, and instead directly uses the pointer to find the first empty physical page.

In the Step 80, according to the virtual page offset value which is the remainder of dividing the virtual page number by the number of pages per block, the FFS judges whether the physical page which has the same offset value with the virtual page is an empty physical page and whether the offset value of this empty physical page is larger than the offset value of any other non-empty physical page. If the results of the two decisions are both yes, Step 86 is executed; otherwise, Step 88 is executed. In the Step 86, the FFS writes data into the physical page which has the same offset value with the virtual page.

In the Step 84, since the corresponding active block does not have any empty physical page, the FFS merges the physical block and its corresponding active block together to generate a new physical block, and then the FFS modifies the first Mapping Table 40 to map the newly generated physical block to the virtual block.

In the process of merging blocks, at the same time, the FFS can write data into the physical page of the newly generated physical block, wherein that physical page is mapped to the virtual page. The FFS can also be designed to further generate a new empty active block and map the new active block onto the new physical block. Then, the FFS writes data into the first page of the new active block (Step 90). Please note that if it is still desired to write data into the physical block afterwards, the FFS will write data into the corresponding active block which is mapped onto the physical block.

In the Step 88, the physical block (also called as the target physical block) doesn't have the corresponding active block and the FFS cannot write data into this target physical block. In order to write data into the target physical block, the FFS first merges the active block and its corresponding physical block (also called as the mapped physical block) together, to generate a new physical block. And then, the FFS modifies the first Mapping Table 40 to map the new physical block onto the virtual block, wherein the virtual block is mapped to that mapped physical block.

Then, the FFS generates a new empty active block, which is mapped to the target physical block. So the FFS can write data into the active block mapped to the target physical block so as to complete data writing operation (Step 92). If it is still desired to write data into the target physical block afterwards, the FFS will write data into the corresponding active block which is mapped onto the target physical block.

The method 70 of the present invention first judges whether the physical block has a corresponding active block. If it doesn't, the FFS checks if data could be written into the physical block under the conditions of having fixed offset relation and satisfying the sequential writing rule. In other words, if the physical block has a corresponding active block, the FFS does not write data into the physical block but writes data into the active block. When the active block does not have any empty physical page, the FFS merges the original physical block and its corresponding active block to generate a new physical block. This results some memory space is released and the released memory space is used to create a new active block. Finally, the FFS writes data into the new active block.

It should be noted that the method 70 of FIG. 10 is merely one of the present invention's preferred embodiments. The FFS can also first judge whether it can write data into the physical block under the conditions of having fixed offset relation and satisfying the sequentially writing rule. If the answer is yes, then the FFS writes data into the physical block. If the answer is no, the FFS then judges whether the physical block has a corresponding active block. If the physical block has a corresponding active block, then the FFS judges whether there exists any empty physical page in the active block. If there is, the FFS writes data into the active block; otherwise, the FFS merges the physical block and the active block to generate a new active block. In other words, the FFS of the present invention also can be designed to first check if data can be written into the physical page regardless of whether the physical block has a corresponding virtual block.

In this embodiment, because the flash memory only has one active block, the FFS only needs to use the second Mapping Table 50 to find the physical block which corresponds to this active block, and then merges the physical block and its corresponding active block. Please note that if the flash memory has more than one active block, the FFS must choose one of them to perform block merging. The FFS can choose one active block out of the candidate active blocks according to the number of non-empty physical pages each active block having. For example, the FFS can choose the more filled active block (having the greater number of non-empty physical pages) to merge with its corresponding physical block. Alternatively, the FFS can also randomly choose an active block to merge with its corresponding physical block.

It should be noted that in the beginning, the active block in the flash memory can be set to be mapped to one specific physical block (also called as the mapped physical block). Then, in the step 88, the FFS uses the second Mapping Table 50 to find the corresponding physical block for block merging, Of course, the active block in the flash memory can also be set to be in an idle mode in the beginning, which is not mapped to any physical block. Additionally, the idle active block is an empty active block. So in the step 88, the FFS can check whether there exists any idle active block. If the answer is no, the FFS uses the second Mapping Table 50 to search for the mapped physical block to do the block merging; otherwise, the FFS maps the idle active block directly onto the target physical block.

Furthermore, the flash memory is allowed to have more than one active block, and the relation between the active block and the physical block can be designed to be mapping one physical block onto more than one active block. If the flash memory only has one active block, and one physical block is mapped to one corresponding active block, the FFS must merge the physical block and the active block to generate a new physical block if there is not any empty physical page in the active block or other physical blocks needs the active block.

Figure 11:
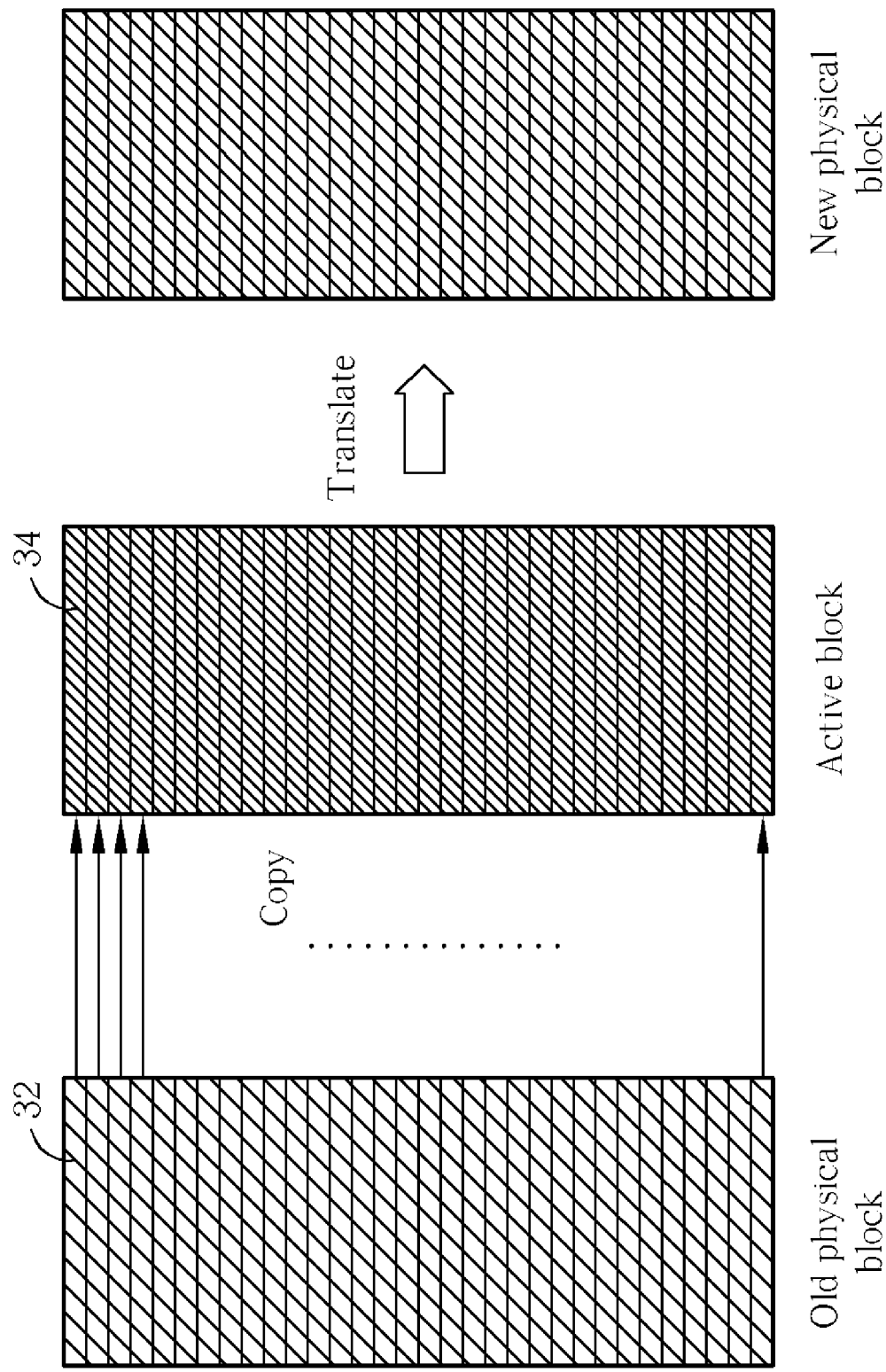
FIG. 11 is a diagram illustrating how to merge the physical block and the active block.

FIG. 11 shows a diagram of how to merge the physical block 32 and the active block 34. The merging method shown in FIG. 11 is suitable for a situation where the offset values of the physical pages in the active block 34 are the same as the offset values of the virtual pages. In other words, the physical pages in the active block 34 have fixed offset relationship with the virtual pages. In this situation, the FFS only needs to copy valid data stored in the old physical block (the above-mentioned target physical block) into the active block, to transform the active block into a new physical block, and then to erase data on the old physical block. In other words, if the data update in the active block 34 obeys the same offset rule (i.e., the physical page and the virtual page have the same offset value), then the FFS only needs to copy all the data stored in the old physical block into the active block, to transform the active block into the new physical block, and to erase all the data in the old physical block. At this time, the FFS modifies the first Mapping Table 40 to map the new physical block onto the virtual block, to which the old physical block is mapped.

Figure 12:
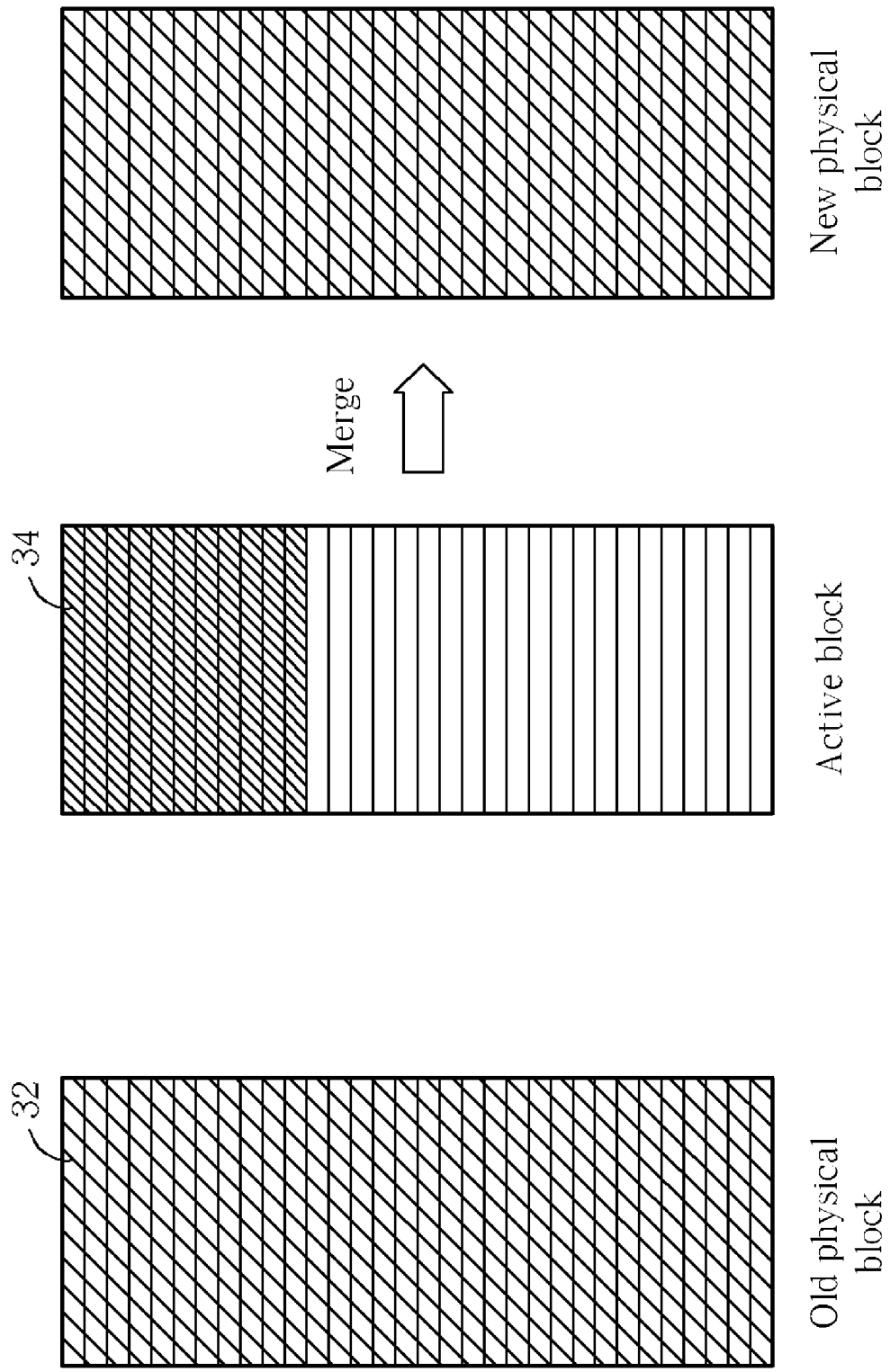
FIG. 12 is another diagram illustrating how to merge the physical block and the active block.

FIG. 12 shows another diagram of how to merge the physical block 32 and the active block 34. The merging method shown in FIG. 12 is suitable for a situation where the offset values of the physical pages in the active block 34 are not the same as the offset values of the virtual pages. In other words, the physical pages in the active block 34 do not have fixed offset relationship with the virtual pages. Under this block merging situation, the FFS first requests a new physical block, and then writes data stored in the old physical block and active block into the new physical block according to the fixed offset relation and sequential writing rules. Then, the FFS erases all the data in the old physical block and the active block. Because the data in the active block doesn't follow the fixed offset rule, the FFS needs to request a new physical block when performing block merging, and then copies the data one by one from the old physical block and the active block into the new physical block. Finally, the FFS erases all the data stored in the old physical block and the active block to complete the block merging. At this time, the FFS modifies the first Mapping Table 40 to map the new physical block onto the virtual block, to which the old physical block is mapped.

Figure 13:
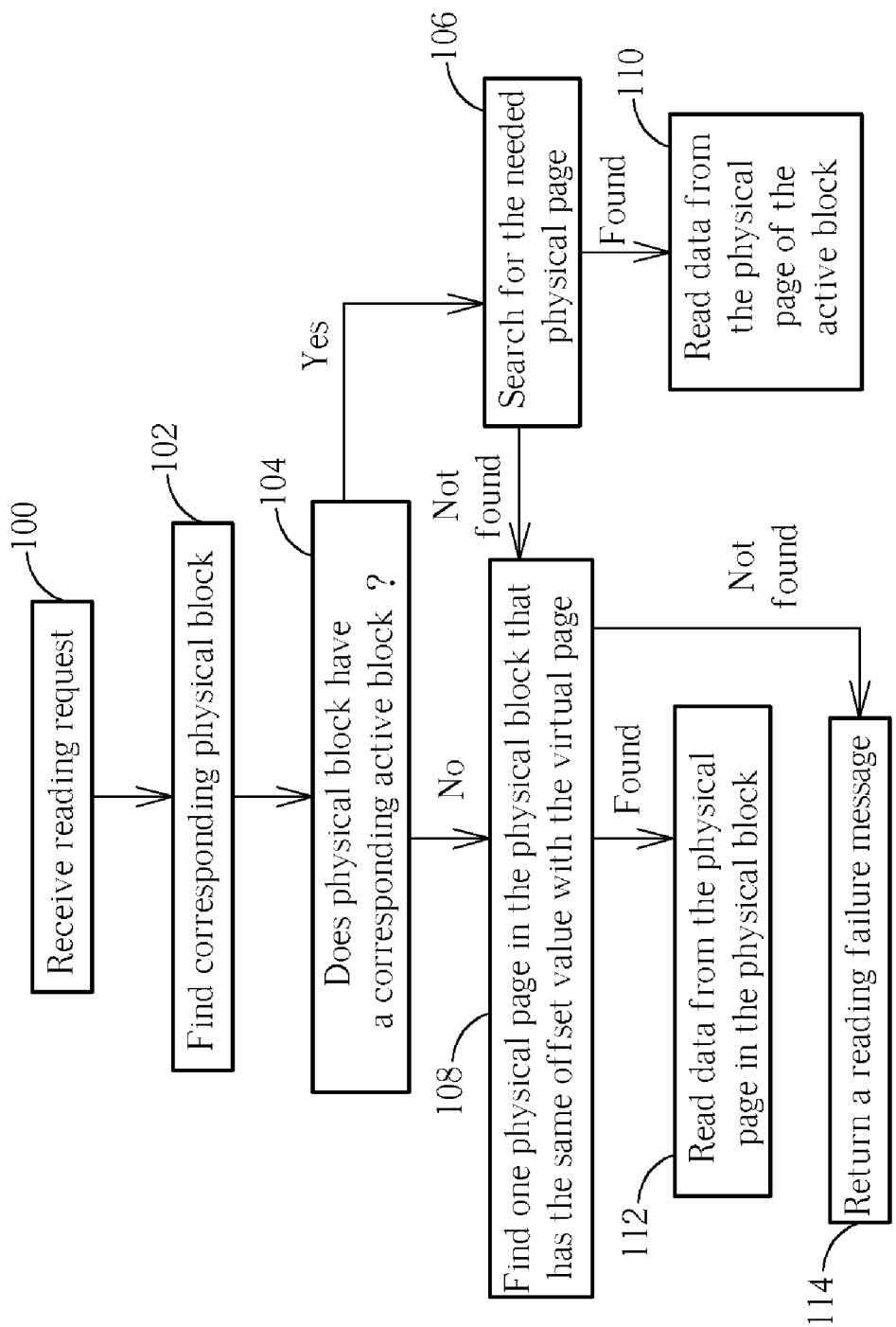
FIG. 13 is a flowchart of reading data according to an exemplary embodiment of the present invention.

FIG. 13 shows a flowchart of reading data from a flash memory according to an exemplary embodiment of the present invention. In the step 100, the FFS receives a reading request from the upper of system, such as FAT. This reading request has a virtual page number. According to the virtual page number, the FFS is capable of locating the corresponding physical block (Step 102). In other words, the FFS divides the virtual page number by the number of pages per block to determine a virtual block address, and then uses the first Mapping Table 40 to identify the corresponding physical block.

Then the FFS uses the second Mapping Table 50 to judge whether the physical block has a corresponding active block (Step 104). If it has, Step 106 is executed; otherwise, Step 108 is executed.

In the Step 106, the FFS searches for the required physical page according to the third Mapping Table 60. In this embodiment, the system has the third Mapping Table 60 to store the mapping relation between virtual pages and the physical pages of the active block, so when reading data, the FFS can find the required physical page quickly by the third Mapping Table 60. However, as known to those skilled in this art, the system can also be designed to work without implementation of the third Mapping Table 60. In this kind of design, memory space is saved, but the reading efficiency is reduced because the FFS must find one page by one page from the first physical page to search for the required physical page when the third Mapping Table 60 does not exist. If the FFS can find the required physical page, it executes the Step 110; otherwise, it executes the Step 108. In the Step 110, the FFS finds the physical page (in the active block) and then reads data therein to complete the reading operation.

In the Step 108, the FFS finds one physical page in the physical block that has the same offset value with the virtual page according to the virtual page's offset value. If the FFS can find the physical page, then it executes the Step 112; otherwise, it executes the Step 114. In the Step 112, the FFS reads data from the physical page in the physical block. In the Step 114, the FFS returns a reading failure message or a specific data pattern to the upper of system, implying that the virtual page does not exist.

The above flowchart can also be designed to first use the virtual page offset value to search for the physical page in the physical block, which has the same offset value with the virtual page, no matter that physical block has a corresponding active block or not. If the FFS fails to find one physical page, the FFS then further judges whether the physical block corresponds to an active block. If it does, the FFS then searches for the physical page in the active block according to the third Mapping Table 60 or the sequential searching method. If there is not any corresponding active block, the FFS returns a reading failure to the upper of system. In the same way, if the required physical page is not found in the active block, the FFS returns a reading failure to the upper of system as well.

In the flash memory of the present invention, the number of active blocks can be set freely. In order to get better reading efficiency, the flash memory can be designed to have few active blocks. Therefore, there are almost physical blocks in the flash memory and data are store in physical blocks according to the fixed offset rule. After the FFS determines the mapped physical block, it can directly search the physical block for a physical page having the same offset value. The FFS can retrieve data from the found physical page without searching from the first physical page. Not only is the complexity of searching reduced, but also the required memory space is reduced. Only when the physical block has a corresponding active block does the FFS need to search one page by one page in the active block. However, if there aren't many active blocks, this does not greatly affect the reading efficiency. Additionally, by the way of the third Mapping Table, the reading efficiency is improved. Although the third Mapping Table consumes memory space, it doesn't consume too much memory space since the number of the active blocks is not great. Briefly, the greater the number of the active blocks, the more memory space needed, but the higher reading efficiency obtained. So, the system designer can design the number of active blocks according to different system requirements.

Figure 14:
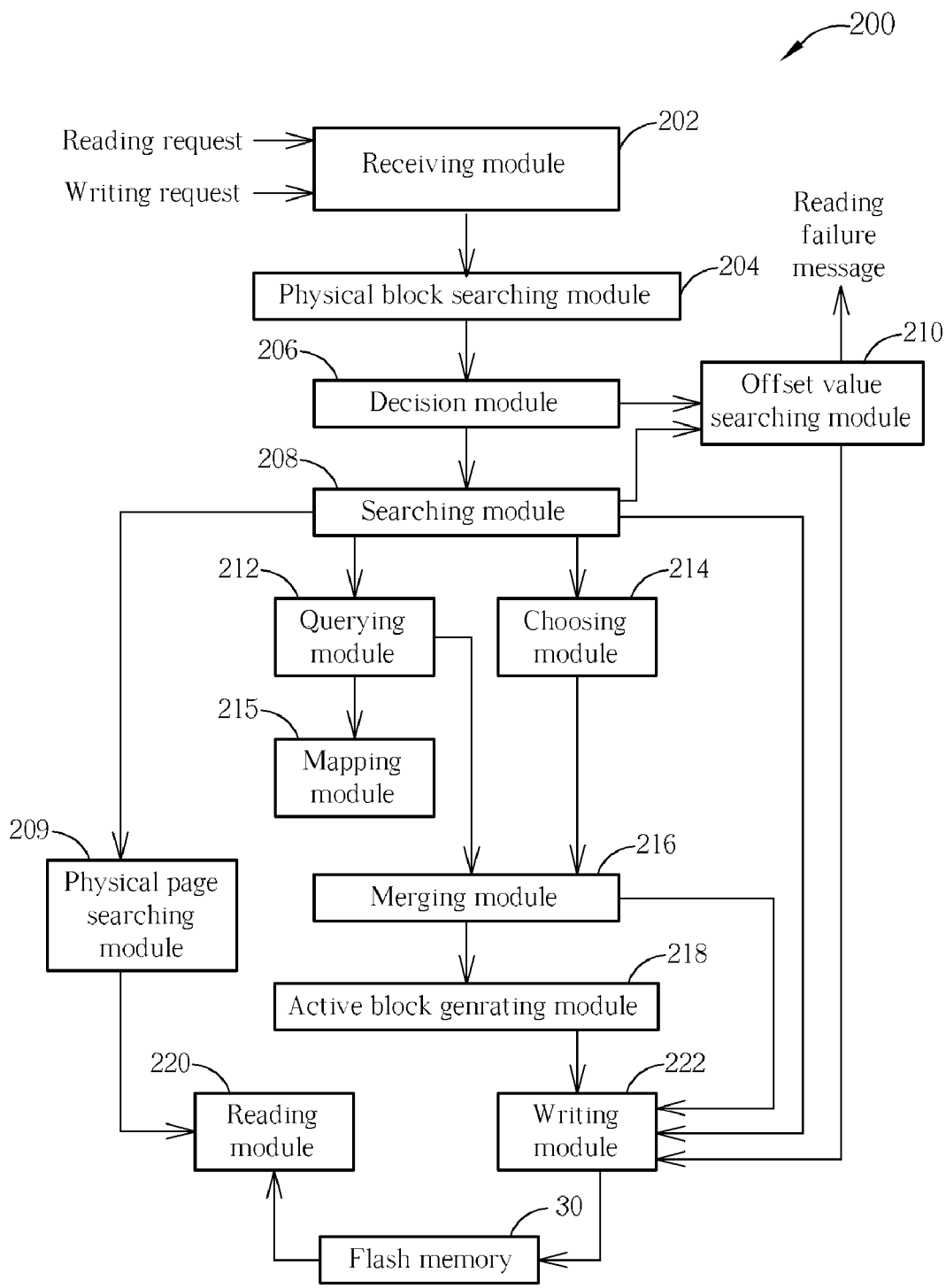
FIG. 14 is a diagram of a system according to an exemplary embodiment of the present invention.

FIG. 14 is a diagram illustrating a system 200 used for performing the above-mentioned method. The receiving module 202 is used to handle steps 72 and 100. The physical block searching module 204 is used to handle steps 74 and 102. The decision module 206 is used to handle steps 76 and 104. The searching module 208 is used to handle step 78. The physical page searching module 209 is used to handle step 106. The offset value searching module 210 is used to handle steps 80, 108 and 114. The querying module 212 is used to query whether there is an idle active block in the flash memory 30. The choosing module 214 is used to select one active block from a plurality of active blocks. The mapping module 215 is used to map the idle active block detected by the querying module 215 onto a physical block. The merging module 216 is used to handle steps 84 and 88. The active block generating module 218 is used to generate a new active block. The reading module 220 is used to handle steps 110 and 112. The writing module 22 is used to handle steps 82, 86, 90 and 92. Since the operation of the present invention method is clearly described above, further description for operation of the associated system components shown in FIG. 14 is omitted for brevity.

As mentioned above, by using the present invention method of updating and reading data of a flash memory, the FFS does not need to move plenty of data and perform the erasing operation too many times with the help of the active block when the system is updating one physical page, so it can have better update efficiency. And since the number of the active bock is not too great, only a small piece of memory space is used to record the data allocation in the active block. Therefore, not only is reading efficiency greatly improved but also data searching and data managing is simplified.

The system designer can configure different levels of data update efficiency by setting different number of implemented active blocks. The more active blocks, the higher the data update efficiency. However, even if there only exists one active block, the data update efficiency is better than related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system capable of sequentially writing data to a flash memory according to a virtual page number, the system comprising:
   at least one virtual block, each virtual block comprising a plurality of virtual pages and a virtual block address, each virtual page having a virtual page offset value;
   at least a physical block in the flash memory, each physical block comprising a plurality of physical pages and a physical block address, each physical page in the physical block having a physical page offset value;
   at least an active block in the flash memory, each active block comprising a plurality of physical pages and an active block address, each physical page in the active block having a physical page offset value; and
   a writing module for writing data to a physical page of a physical block having a physical page offset value equal to a virtual page offset value or to a physical page of an active block according to predetermined rules;
   wherein each virtual block is mapped onto a physical block, and each active block is mapped onto a physical block; in the corresponding virtual and physical blocks, every virtual page is mapped onto every physical page, and in the corresponding virtual and physical pages, the virtual page offset value is always equal to the physical page offset value.

2. The system of claim 1, further comprising:
a first Mapping Table comprising a plurality of first mapping data, each of the first mapping data storing a virtual block address and a physical block address to map a specific virtual block onto a specific physical block.

3. The system of claim 1, further comprising:
a second Mapping Table comprising a plurality of second mapping data, each of the second mapping data comprising a physical block address and an active block address to map a specific active block onto a specific physical block.

4. The system of claim 1, further comprising:
a third Mapping Table comprising a plurality of third mapping data, each of the third mapping data comprising a virtual page offset value and a physical page offset value to map a specific virtual page onto a specific physical page of a specific active block.

5. The system of claim 1, further comprising:
a receiving module for receiving an access request, wherein the access request comprises the virtual page number representing a virtual page;
a physical block searching module for finding out a specific physical block of the at least a physical block in the flash memory according to the virtual page number; and
a decision module for determining whether the specific physical block is mapped to an active block of the at least an active block in the flash memory.

6. The system of claim 1, further comprising:
a receiving module for receiving a writing request, wherein the writing request comprises the virtual page number representing a virtual page;
a physical block searching module for determining a virtual block address according to the virtual page number to find out a specific physical block of the at least a physical block in the flash memory;
a decision module for determining whether the specific physical block is mapped to an active block of the at least an active block in the flash memory;
a searching module for searching the mapped active block to determine whether the mapped active block has an empty physical page;
an offset value searching module for determining the virtual page offset value according to the virtual page number to determine whether a physical page which has the offset value the same as the virtual page offset value is an empty physical page in the specific physical block; and
a writing module for writing data to the empty physical page of the mapped active block or the empty physical page of the specific physical block.

7. The system of claim 6, further comprising a merging module for merging a specific active block and its corresponding mapped physical block to generate a new physical block.

8. The system of claim 7, further comprising an active block generating module for generating a new active block, wherein the new active block is mapped onto the new physical block and is an empty active block.

9. The system of claim 8, further comprising a querying module for querying whether there is an idle empty active block in the flash memory.

10. The system of claim 9, further comprising a mapping module for mapping the idle empty active block onto the specific physical block.

11. The system of claim 7, further comprising an active block generating module for generating a new active block, wherein the new active block is mapped onto the specific physical block and is an empty active block.

12. The system of claim 7, further comprising a choosing module for choosing the specific active block for block merging.

13. The system of claim 12, wherein the choosing module randomly chooses the specific active block.

14. The system of claim 12, wherein the choosing module chooses the specific active block according to the quantity of data stored in active block.

15. The system of claim 1, further comprising:
a receiving module for receiving a reading request, the reading request comprising the virtual page number; a physical block searching module for determining a virtual block address according to the virtual page number to find out a specific physical block of the at least a physical block in the flash memory;
a decision module for determining whether the specific physical block is mapped to an active block of the at least an active block in the flash memory;
a searching module for searching the mapped active block to determine a needed physical page;
an offset value searching module for determining a virtual page offset value according to the virtual page number to find out the physical page which has an offset value the same as the virtual page offset value; and a reading module for reading data from the physical page.

16. A method of accessing data in a flash memory which is applied in an electronic device, the electronic device comprising:
- at least a virtual block, each virtual block comprising a plurality of virtual pages and a virtual block address, each virtual page having a virtual page offset value;
- at least a physical block in the flash memory, each physical block comprising a plurality of physical pages and a physical block address, each physical page having a physical page offset value; and
- at least an active block in the flash memory, each active block comprising a plurality of physical pages and an active block address, each physical page having a physical page offset value;
- wherein each virtual block is mapped onto a physical block, and each active block is mapped onto a physical block; in the corresponding virtual and physical blocks, every virtual page is mapped onto one physical page, and in the corresponding virtual and physical pages, the virtual page's offset value is always equal to the physical page's offset value;

the method comprising:
- receiving an access request which comprises a virtual page number representing a virtual page;
- finding a specific physical block according to the virtual page number;
- determining whether the specific physical block is mapped to an active block; and
- accessing data at a physical page having a physical page offset value equal to the virtual page offset value in the specific physical block or at a physical page of the active block according to predetermined rules.

17. The method of claim 16, being used to write data into the flash memory, further comprising:
- receiving a writing request, wherein the writing request comprises a virtual page number representing a specific virtual page;
- finding out a specific physical block according to the virtual page number;
- determining whether the specific physical block is mapped to an active block;
- when it is determined that the physical block is mapped to an active block, determining whether the mapped active block has an empty physical page;
- when it is determined that the mapped active block has the empty physical page, writing data into the empty physical page;
- when it is determined that the mapped active block does not have the empty physical page, merging the specific physical block and its corresponding mapped active block into a new physical block and writing data into a new active block;
- when it is determined that the specific physical block is not mapped to an active block, utilizing the virtual page number to determine a virtual page offset value, and determining whether a physical page which has an offset value the same as the virtual page offset value is an empty physical page in the specific physical block;
- when it is determined that a physical page which has an offset value the same as the virtual page offset value is the empty physical page in the specific physical block, writing data into the empty physical page in the specific physical block; and
- when it is determined that a physical page which has an offset value the same as the virtual page offset value is not an empty physical page in the specific physical block, merging the specific physical block and its corresponding active block into a new physical block and writing data into a new active block.

18. The method of claim 17, further comprises:
choosing a physical block which is mapped to an active block before merging the specific physical block and its corresponding active block into a new physical block and writing data into a new active block.

19. The method of claim 17, wherein when it is determined that the mapped active block does not have the empty physical page, merging the specific physical block and its corresponding mapped active block into a new physical block and writing data into a new active block further comprises:
after merging the specific physical block and its corresponding mapped active block, generating a new physical block and mapping the new physical block onto a virtual block, to which the specific physical block is mapped.

20. The method of claim 19, wherein after when it is determined that the mapped active block does not have the empty physical page, merging the specific physical block and its corresponding mapped active block into a new physical block and writing data into a new active block, the method further comprises generating a new active block which is mapped onto the new physical block and is an empty active block.

21. The method of claim 17, wherein when it is determined that a physical page which has an offset value the same as the virtual page offset value is not an empty physical page in the specific physical block, merging the specific physical block and its corresponding active block into a new physical block and writing data into a new active block further comprises:
after merging a specific physical block and its corresponding mapped active block, generating a new physical block and mapping the new physical block onto a virtual block, to which the specific physical block to mapped.

22. The method of claim 21, wherein after when it is determined that a physical page which has an offset value the same as the virtual page offset value is not an empty physical page in the specific physical block, merging the specific physical block and its corresponding active block into a new physical block and writing data into a new active block, the method further comprises generating a new active block which is mapped onto the specific physical block and is an empty active block.

23. The method of claim 17, wherein before when it is determined that a physical page which has an offset value the same as the virtual page offset value is not an empty physical page in the specific physical block, merging the specific physical block and its corresponding active block into a new physical block and writing data into a new active block, the method further comprises querying whether there is an idle active block.

24. The method of claim 23, wherein if the idle active block exists, the idle active block is mapped onto the specific physical block.

25. The method of claim 16, being used to read data from the flash memory, further comprising:
- receiving a reading request, wherein the reading request comprises the virtual page number representing the virtual page;
- determining a virtual block address according to the virtual page number for finding out the specific physical block;
- determining whether the specific physical block is mapped to the active block;

when it is determined that the specific physical block is mapped to the active block, searching for the mapped active block to find out a needed physical page; and when it is determined that the specific physical block is not mapped to the active block, determining the virtual page offset value according to the virtual page number to search the specific physical block for a physical page which has a physical page offset value identical to the virtual page offset value.

* * * * *